(12) United States Patent
Huard et al.

(10) Patent No.: US 6,669,921 B2
(45) Date of Patent: Dec. 30, 2003

(54) PROCESS FOR REGENERATING A CATALYTIC REDOX SOLUTION, TO INCLUDE MEASURING THE OXYGEN DISSOLVED IN THE REGENERATION EFFLUENT AND ITS APPLICATION TO DESULFURIZATION

(75) Inventors: Thierry Huard, Montrouge (FR); Christian Streicher, Rueil Malmaison (FR)

(73) Assignee: Institute Francais du Petrole, Rueil-Malmaison (FR)

( * ) Notice: Subject to any disclaimer, the term of this patent is extended or adjusted under 35 U.S.C. 154(b) by 73 days.

(21) Appl. No.: 10/023,765

(22) Filed: Dec. 21, 2001

(65) Prior Publication Data

US 2002/0119086 A1 Aug. 29, 2002

(30) Foreign Application Priority Data

Dec. 21, 2000 (FR) .............................. 00 16729

(51) Int. Cl.$^7$ .............................. C01B 17/05
(52) U.S. Cl. .............................. 423/573.1; 423/576.4; 423/576.5; 423/576.6; 423/576.7; 423/576.8
(58) Field of Search .............................. 423/573.1, 576.4, 423/576.5, 576.6, 576.7, 576.8

(56) References Cited

U.S. PATENT DOCUMENTS

| 4,091,073 A | * | 5/1978 | Winkler | 423/226 |
| 4,332,781 A | * | 6/1982 | Lieder | 423/573 G |
| 4,485,082 A | * | 11/1984 | Blytas | 423/573 R |
| 4,532,118 A | | 7/1985 | Tajiri et al. | 423/226 |
| 4,859,436 A | | 8/1989 | Olson et al. | 423/221 |
| 5,753,189 A | | 5/1998 | Rehmat | 422/110 |

FOREIGN PATENT DOCUMENTS

| DE | 3444252 A1 | 6/1985 |
| FR | 2771945 A1 | 6/1999 |
| FR | 2794665 A1 | 12/2000 |

* cited by examiner

Primary Examiner—Stanley S. Silverman
Assistant Examiner—Timothy C. Vanoy
(74) Attorney, Agent, or Firm—Millen, White, Zelano, Branigan, P.C.

(57) ABSTRACT

The present invention relates to a process for regenerating an at least partly reduced catalytic redox solution. The solution includes at least one polyvalent metal chelated by a chelating agent and is circulated in at least one regeneration zone while an oxygen-containing gas is injected into the regeneration zone. The process includes measuring a concentration of oxygen dissolved in a regeneration zone effluent. The process also includes adjusting a flow rate of the at least partly reduce catalytic redox solution entering the at least one regeneration zone and/or an oxygen-containing gas entering the regeneration zone in response to a measured concentration of oxygen, until a concentration of oxygen in the regeneration zone effluent is less than 20% of an amount of oxygen dissolved in water saturated with oxygen. Thus, degradation of the chelating agent in the catalytic redox solution is minimized.

10 Claims, No Drawings

PROCESS FOR REGENERATING A CATALYTIC REDOX SOLUTION, TO INCLUDE MEASURING THE OXYGEN DISSOLVED IN THE REGENERATION EFFLUENT AND ITS APPLICATION TO DESULFURIZATION

This invention pertains to a process for regenerating a catalytic solution in a process for desulfurization by oxidation-reduction of a gaseous feedstock that contains hydrogen sulfide in order, on the one hand, to optimize the operation of the process based on the quantity of $H_2S$ to be eliminated and, on the other hand, to reduce the degradation of the chelating or complexing agent used in the process.

The process according to the invention is applied in particular to the regeneration in air of the catalytic solution during the course of a "redox" desulfurization process for a gas that contains at least hydrogen sulfide. During this process, a catalytic solution is used that contains at least one polyvalent chelated metal ($Fe^{3+}$, $V^{5+}$), by at least one chelating agent under conditions that are suitable for ensuring the oxidation of hydrogen sulfide into elementary sulfur and the simultaneous reduction of the polyvalent chelated metal from a higher level of oxidation to a lower level of oxidation. On the one hand, a gaseous effluent that is essentially devoid of hydrogen sulfide and, on the other hand, an elementary sulfur-containing catalytic solution that is at least partially reduced are recovered. The solid elementary sulfur may or may not be separated from the partially reduced catalytic solution. At least a portion of said partially reduced catalytic solution, which may or may not be stripped of the majority of the solid elementary sulfur, is expanded. In general, said solution is regenerated with air in a regeneration zone. At the outlet from this regeneration stage, the regenerated solution is recycled to the stage where the hydrogen sulfide-containing gas is oxidized.

The prior art describes many redox processes and associated devices that make it possible to eliminate hydrogen sulfide and to recover the elementary sulfur that is formed during the process.

The desulfurization process includes, for example, the following two oxidation-reduction stages:

In a first stage (stage of absorption, oxidation-reduction reaction) the hydrogen sulfide that is present in the gas to be treated reacts with chelated ferric ions according to the reaction:

$$H_2S + 2\ Fe^{3+}(chel.) \rightarrow S + 2\ H^+ + 2\ Fe^{2+}(chel.) \quad (1)$$

in a second stage (regeneration stage), the ferrous ions are reoxidized by oxygen from the air according to the reaction:

$$O_{2 gas} \rightarrow O_{2 liquid} \quad (2)$$

$$2\ Fe^{2+}(chel.) + 2\ H^+ + \tfrac{1}{2}O_2 \rightarrow 2\ Fe^{3+}(chel.) + H_2O \quad (3)$$

Thus, the overall reaction is:

$$H_2S + \tfrac{1}{2}O_2 \rightarrow \tfrac{1}{8}S_8 + H_2O$$

In the case where the metal is vanadium, the regeneration reaction is as follows:

$$Na_2V_4O_9 + 2\ NaOH + O_2 \xrightarrow[H_2ADA]{ADA} 4\ NaVO_3 + H_2O.$$

In this reaction, secondary reactions may lead to a degradation of the ADA.

It is known that redox processes are flexible with regard to their treatment capacity in terms of flow rates and $H_2S$ concentrations, but this flexibility is generally achieved without oxygen control. Conversely, it is also known that it is during the second stage that the degradation of the chelating agent occurs; this makes the process expensive because it is then necessary to re-add said agent. Moreover, the degradation of the chelating agent leads to the formation of products that accumulate in the catalytic solution and can precipitate out. These organic or inorganic products are entrained by the sulfur and reduce its quality, thus increasing costs. This degradation involves highly reactive radicals such as free radicals that are initiated by the presence of dissolved oxygen in the catalytic solution.

The catalytic solutions are thus complex because they are charged with organic or inorganic compounds and have more or less elevated concentrations, depending on the formulations. This presence of compounds has a direct effect on the first stage of the regeneration reaction, reaction (2), which is the transfer of gaseous oxygen into the catalytic solution, and consequently on the presence of dissolved oxygen in the heart of the solution.

In order to mitigate the degradation of the chelating agent, U.S. Pat. No. 5,223,173 claims to run the process with an excess of the complexed polyvalent metal at a lower level of oxidation, regardless of whether it is at the absorption or the oxidation stage.

By operating with an excess of complexed metal at the lowest level of oxidation, however, this process will be less flexible in the face of fluctuations in the flow rate or $H_2S$ concentration in the gas to be treated. The treatment capacity of the process will thus be smaller with equivalent sizing.

In U.S. Pat. No. 5,422,086, the degradation of the chelating agent is assumed to be in relation to, on the one hand, the dwell time of the solution in the reactor and, on the other hand, to be inversely proportional to the metal concentration at the lowest level of oxidation. In order to reduce the degradation of the chelating agent, the concept is not to convert the iron(II) completely into iron(III) at a total iron(II)/iron(III) ratio of less than 0.1. In order to avoid back-mixing phenomena, this patent claims to use two reactors, whereby the first operates in co-current and the second in counter-current. As described, the process makes it possible to have an Fe(II) concentration of less than 0.1 mole per mole of total iron at the outlet from the regeneration stage.

This device, which requires two reactors for the catalytic solution regeneration stage, turns out to be very expensive, however.

Finally, using an anti-oxidizing agent such as thiosulfate can also help to reduce the degradation of the chelating agent. U.S. Pat. No. 6,083,472 claims a method for generating thiosulfate ions using a draw-off of the gas to be treated. This fraction is treated with soda or potassium, and HS is transformed into $HS^-$ ions. This solution is then injected with the reduced catalytic solution directly into the oxidizer where the $HS^-$ ions are oxidized into thiosulfates, while the reduced catalytic solution is reoxidized. It is thus necessary to insert an additional reactor, along with managing chemical products that are added to the chemical products already required in the redox processes.

Patent No. FR-A-2 794 665 also describes a device for dispersing into very small bubbles in said solution the gas that is used to regenerate the catalytic solution.

Patent FR-A-2 771 945 also teaches the regeneration of an aqueous catalytic phase by an oxidizing agent.

Finally, the technological background is illustrated by patents U.S. Pat. No. 4,859,436, U.S. Pat. No. 4,532,118, U.S. Pat. No. 5,753,189 and DE 3 444 252.

One of the objects of the invention is to remedy the deficiencies of the prior art.

Another object of the invention is to propose a new approach to operating the catalytic solution regeneration stage that makes it possible, on the one hand, to ensure optimum adjustment of oxygen consumption in the process and, on the other hand, to reduce the degradation of the complexing agent during the regeneration stage.

More specifically, the invention pertains to a process for regenerating a catalytic redox solution that is at least partly reduced, whereby it comprises at least one chelating agent of a polyvalent metal associated with said solution in which, in at least one regeneration zone, said solution is circulated in the presence of an oxygen-containing gas under appropriate regeneration conditions, and a regeneration effluent that is at least partially oxidized is recovered; this is done by measuring the concentration of oxygen dissolved in the regeneration effluent and adjusting the operating parameters so as to minimize the degradation of the chelating agent and to regenerate at least a portion of the catalytic solution.

In order to accomplish this function, the residual dissolved-oxygen concentration is usually measured at the outlet of the regeneration stage by means of a specific sensor. It is advantageous for this measurement to be made on line, and this measurement can do its monitoring by controlling, for example, the flow rate of air or liquid to the oxidizer. The control can be manual or automatic.

More specifically, this invention pertains to a process for regenerating the catalytic solution that is used in a process for desulfurization of a gaseous feedstock that contains hydrogen sulfide.

A regeneration effluent can be defined as an effluent in which the ironII/total iron ratio is usually less than 0.5, i.e., it has an oxidizing power that is advantageously less than 0.1, as described in U.S. Pat. No. 5,422,086.

The desulfurization process can include, for example, the following sequence of stages:

The gaseous feedstock is brought into contact with an aqueous catalytic solution that includes a least one chelated polyvalent metal, e.g., iron, by least one chelating or complexing agent under absorption conditions that are suitable for bringing about the oxidation of the hydrogen sulfide into elementary sulfur and the concomitant reduction of the polyvalent metal from a higher level of oxidation to a lower level of oxidation; and, on the one hand, a gaseous effluent that is essentially stripped of hydrogen sulfide and, on the other hand, the catalytic solution that is at least partially reduced and that contains elementary sulfur are recovered, the elementary sulfur is optionally separated, said filtered or unfiltered catalytic solution is sent to the air regeneration stage, said reduced solution is regenerated in a regeneration zone by bringing it into contact with an oxidizing agent, and the catalytic solution which is at least partly regenerated is recovered, and at least a portion of the regenerated aqueous catalytic solution is recycled to the $H_2S$ absorption stage, at the outlet from the regeneration zone, the concentration of oxygen dissolved in the catalytic solution is measured, based on the measurement, the operating parameters of the regeneration stage such as, for example, the flow rate of air and/or the flow rate of liquid to the oxidizer are manipulated so that there will be controlled oxygen transiron conditions at the outlet of the regeneration zone.

The elementary sulfur can be separated under pressure or at atmospheric pressure. The solution to be regenerated can be expanded and/or depressurized, or it can be under pressure.

According to one embodiment of the process, this measurement of the residual dissolved-oxygen concentration is advantageously carried out on line and under continuous conditions, and the operation of the oxidizer is slaved to the measurement. It is also possible to adjust the operating parameters of the process continuously, especially the flow rate of the oxygen-containing gas.

According to one implementation of the process, it is possible to manipulate the operating parameters such as, for example, the flow rate of air or the flow rate of liquid sent to the oxidation stage so as to obtain a dissolved-oxygen concentration value of less than 20% of the dissolved-oxygen concentration value at saturation in water under the temperature and pressure conditions of the regeneration process, which value is advantageously less than 10%, preferably between 0.01% and 5%, and more particularly essentially equal to 0%.

The sensor will preferably be installed at the outlet of the oxidizer. This sensor consists of a probe for measuring the dissolved oxygen, whose measurement principle can be, for example, amperometric or polarographic.

The measurement is generally done at an effluent temperature of between 15° C. and 50° C, i.e., essentially that of the regeneration temperature and at a pressure that is usually between atmospheric pressure and several bar (1 bar=$10^5$ Pa).

The catalytic solution, which is preferably aqueous, can be a chelated iron solution that is produced from ferrous iron or ferric iron, such as sulfates, nitrates, thiosulfate, chloride, acetate, oxalate, phosphates, soluble salts of iron and ammonium or potassium, such as ferrous iron sulfate and ammonium sulfate, ferric ammonium oxalate, and ferric potassium oxalate.

It is possible to use chelating agents by themselves or in a mixture, such as organic compounds that are known for their complexing properties, for example acetyl acetone, citric acid, salicylic acid, sulfosalicylic acid, tiron (catechodisulfonic acid), dimercapto-2-3 propanol, and amino acids, for example, EDTA (ethylene diamine tetraacetic acid), HEDTA (hydroxy 2 ethylene diamine triaacetic acid), NTA (nitrilotriacetic acid), DCTA (diamino-1-2 cyclohexane tetraacetic acid), DPTA (diethylene triamine pentaacetic acid), IDA (iminodiacetic acid), and ADA (N-2-acetamido diacetic acid).

The regeneration stage can be carried out in bubble column or ejector reactors, as described in, for example, Patent FR 99/07360.

According to one implementation of the process, the absorption and regeneration reactors can be common. In this case, the dissolved oxygen can be measured on the effluent which has an ironII/total iron ratio, before or after the filtration stage, of less than 0.5.

According to another implementation of the process, the catalytic solution can be an organic solution.

According to another implementation of the process, the regeneration stage is carried out in reactors operating in co-current or counter-current with the oxidizing agent being fed in.

Air or oxygen can be used as an oxidizing agent for the regeneration stage.

The process can be implemented as follows:

A catalytic solution that is at least partly reduced is sent into a regeneration zone. The solution, which is regenerated by contact with air, is such that at the outlet there is, for example, an ironII/total iron ratio of less than 0.1, i.e., an excess of ironIII. The dissolved-oxygen concentration that is measured is, for example, 50% of the dissolved-oxygen concentration value at saturation in water. It will then be possible to reduce the flow rate of air so as to obtain a dissolved-oxygen content in the solution of less than 5%, and preferably close to 0, with an ironII/total iron ratio of less than 0.1. Under these controlled oxygen-transfer conditions, the oxygen that is consumed contributes only to the regeneration reaction and not to secondary reactions such as those involving degradation of the chelating agent.

By way of example, a series of experiments was carried out in a batch-type reactor, whereby the percentage of residual oxygen was measured with a probe of the INGOLD brand.

The test is carried out by simultaneously injecting $H_2S$ and air at a flow rate of 90 l/h at the bottom of the column.

The variation in the $H_2S$ flow rate makes it possible to manipulate the oxygen transfer conditions and therefore the concentration of dissolved oxygen in the solution.

The catalytic solution is an iron solution that is complexed by nitrilotriacetic acid and respective concentrations of 0.25 and 0.5 mol/l. The pH of the tests is kept at 7 by adding a base if necessary. During the tests, sulfur is periodically withdrawn from the solution by filtration of the solution.

Degradation of the complexing agent is tracked by sampling and conducting capillary electrophoresis analysis. This analysis also makes it possible to identify degradation products such as, for example, oxalate and glycine.

The table below presents the results obtained regarding the chemical degradation of a complexing agent in the case of a solution that contains 0.5 mole/l of a complexing agent and 0.25 mole/l of total iron. The pH of the solution is kept at 7. The degradation of the complexing agent is related to the quantity of sulfur treated.

The experiment was carried out at 20° C. and at atmospheric pressure.

| $H_2S$ (l/h) | Sulfur (g/h) | Residual $O_2$ (%) | Rate of Degradation (mol/l · kg) * 1000 |
|---|---|---|---|
| 0.4 | 0.57 | 0 | 0.7 |
| 0.12 | 0.17 | 18 | 1.8 |
| 0.11 | 0.157 | 50 | 2.7 |

Under the above-described test conditions, the dissolved-oxygen saturation of the solution related to water is 8 mg/l.

Consequently, the consumption of complexing agent will be reduced when the regeneration stage is carried out under controlled oxygen-transfer conditions.

The process thus proves to be more economical.

What is claimed is:

1. A process for regenerating an at least partly reduced catalytic redox solution comprising at least one polyvalent metal chelated by a chelating agent and being circulated in at least one regeneration zone while injecting an oxygen-containing gas into the regeneration zone, the process comprising:

measuring a concentration of oxygen dissolved in a regeneration zone effluent and adjusting a flow rate of the at least partly reduced catalytic redox solution entering the at least one regeneration zone and/or an oxygen-containing gas entering the regeneration zone in response to a measured concentration of oxygen, until a concentration of oxygen in the regeneration zone effluent is less than 20% of an amount of oxygen dissolved in water saturated with oxygen, thereby minimizing degradation of the chelating agent in the catalytic redox solution.

2. A process according to claim 1, wherein the concentration value of oxygen dissolved in the regeneration effluent is less than 10% of the dissolved-oxygen concentration value at saturation in water under the conditions of the regeneration process.

3. Process according to one of claim 1, wherein the dissolved-oxygen concentration in said effluent is measured by means of a probe whose measurement principle is amperometric or polarographic.

4. A process according to one of claim 1, wherein the dissolved-oxygen concentration is measured on line.

5. Process according to claim 4, wherein the flow rate of the oxygen-containing gas is continually adjusted in the regeneration zone.

6. A process according to one of claim 1, wherein the chelating agent is selected from the group formed by acetyl acetone, citric acid, salicylic acid, sulfosalicylic acid, tiron, dimercapto-2-3 propanol, ethylene diamine tetraacetic acid, nitrilotriacetic acid, hydroxy 2 ethylene diamine triaacetic acid, diamino-1-2 cyclohexane tetaacetic acid, and N-2-acetamido diacetic acid.

7. A process according to one of claim 1, wherein the metal is iron or vanadium.

8. A process for desulfurizing a hydrogen sulfide-containing gas comprising reacting said gas in an absorption zone the gas with a catalytic redox solution that is at least partly oxidized, recovering sulfur along with a catalytic solution that is at least partly reduced, regenerating said catalytic solution, which is at least partly reduced, according to the process of claim 1, and recycling the regeneration effluent to the absorption zone.

9. A process according to claim 2, wherein the dissolved oxygen value is between 0.1 and 5% of said dissolved-oxygen concentration at saturation with water.

10. A process according to claim 9, wherein said dissolved oxygen value is essentially equal to zero.

* * * * *

UNITED STATES PATENT AND TRADEMARK OFFICE
CERTIFICATE OF CORRECTION

PATENT NO.    : 6,669,921 B2  
DATED         : December 30, 2003  
INVENTOR(S)   : Thierry Huard et al.

Page 1 of 1

It is certified that error appears in the above-identified patent and that said Letters Patent is hereby corrected as shown below:

<u>Column 6,</u>  
Line 37, reads "formed by" should read -- consisting of --  
Line 47, delete "the gas"

Signed and Sealed this

Twenty-eighth Day of September, 2004

JON W. DUDAS  
*Director of the United States Patent and Trademark Office*